United States Patent [19]

Kriz

[11] Patent Number: 4,680,703
[45] Date of Patent: Jul. 14, 1987

[54] DATA PROCESSING SYSTEM WITH REORGANIZATION OF DISK STORAGE FOR IMPROVED PAGING

[75] Inventor: Thomas A. Kriz, Sandy Hook, Conn.

[73] Assignee: International Business Machines Corp., Armonk, N.Y.

[21] Appl. No.: 624,485

[22] Filed: Jun. 25, 1984

[51] Int. Cl.$^4$ .................. G06F 12/12; G11B 20/12
[52] U.S. Cl. .................................................. 364/200
[58] Field of Search ... 364/200 MS File, 900 MS File; 360/78

[56] References Cited

U.S. PATENT DOCUMENTS

| | | | |
|---|---|---|---|
| 4,126,893 | 11/1978 | Crenshaw et al. | 364/200 |
| 4,197,588 | 4/1980 | Cason et al. | 364/900 |
| 4,435,752 | 3/1984 | Winkelman | 364/200 |
| 4,494,157 | 1/1985 | Iha et al. | 360/49 |
| 4,542,458 | 9/1985 | Kitajima et al. | 364/200 |

OTHER PUBLICATIONS

*Computer Systems Architecture*, by Baer ©1980, pp. 269–309.
IBM Technical Disclosure Bulletin vol. 14, No. 7 (Dec. 1971) entitled High-Performance Storage Device, by Evans et al.

*Primary Examiner*—A. E. Williams
*Assistant Examiner*—Lawrence E. Anderson
*Attorney, Agent, or Firm*—W. S. Robertson

[57] ABSTRACT

In a data processor having a paging system, a list is kept of the disk seek time when a page of information is brought into processor memory from a disk storage device. (Seek time is the time for moving the disk read-write head radially inward or outward to the next track that is to be accessed.) The average seek time for the pages in memory is calculated and is compared with a reference value of seek time. When the average reaches the reference, the pages in memory are reordered on the disk. This reordering takes place as the pages are bumped from memory in the normal process of paging, and the pages are relocated on the disk tracks in the physical order in which the pages were originally brought into memory. If approximately the same pages are fetched again in approximately the same sequence, the read-write head of the disk drive will be moved a shorter distance between successive disk accesses with reduced backtracking. The invention is particularly intended for a data processor of intermediate size that is large enough to use a paging system but small enough to use a disk drive that has an appreciable seek time.

1 Claim, 2 Drawing Figures

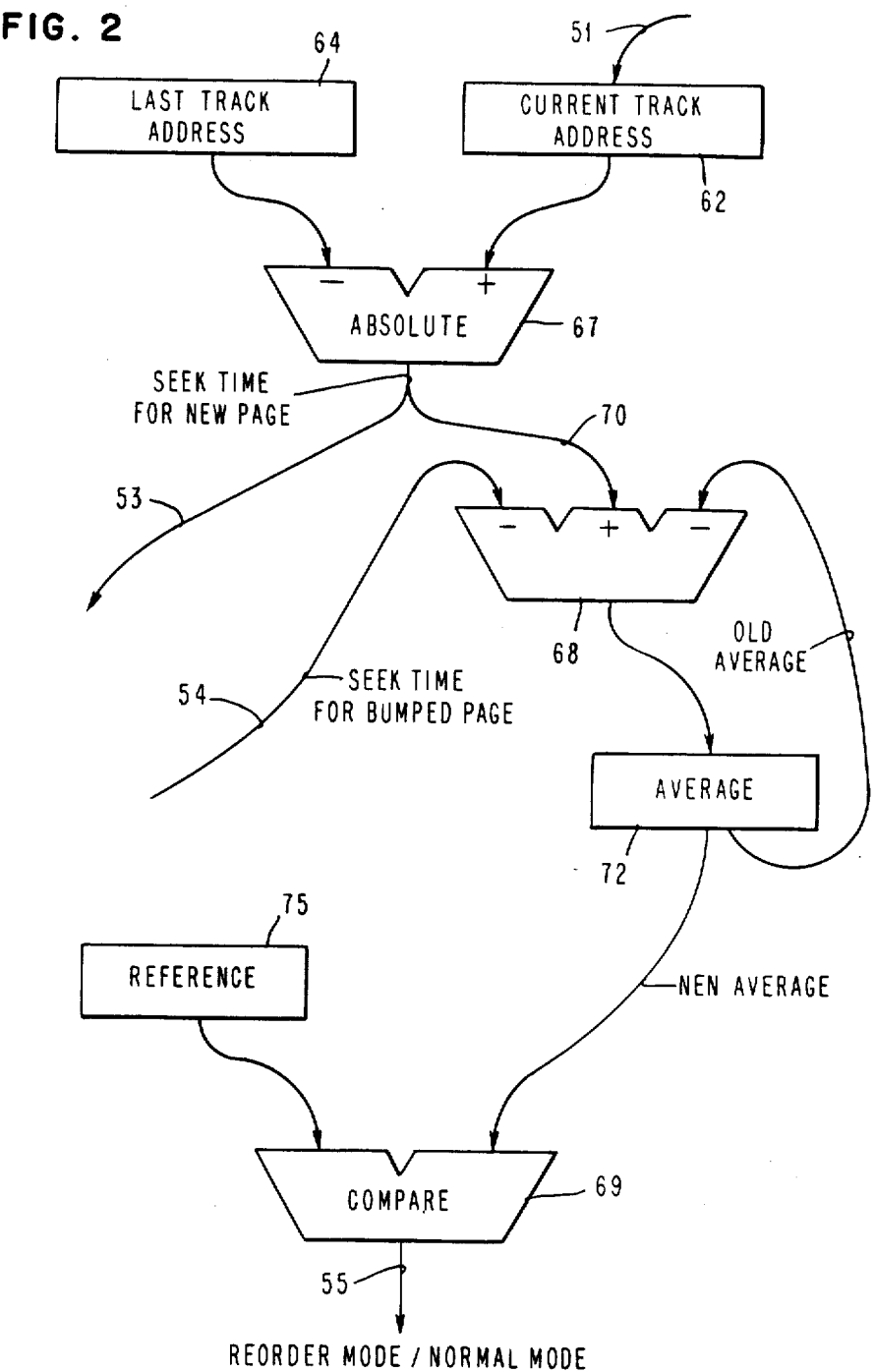

DATA PROCESSING SYSTEM WITH REORGANIZATION OF DISK STORAGE FOR IMPROVED PAGING

FIELD OF THE INVENTION

This invention relates to an improvement in a data processing system having a paging system for transferring pages of information between processor memory and a disk storage device, and more specifically it relates to a system for reorganizing the pages on the disk to reduce the motion of the disk read-write head in the operation to seek a track of the disk.

RELATED PUBLICATIONS

A publication, *Introduction to Virtual Storage in System/370*, number GR20-4260-1, published by International Business Machines Corporation, provides a simplified explanation of a paging system. Some of the terminology in this specification is taken from Madnick and Donovan, *Operating Systems*, published 1974 by McGraw-Hill Book Company.

INTRODUCTION

Data Organization in Main and Auxiliary Storage

It will be helpful here to review just the features and terminology that particularly apply to this invention. In a data processing system, the data storage system is commonly organized on two levels that are variously called primary and secondary, main and auxiliary, or processor and I/O (input/output). The terms storage device, store and memory will be used interchangeably for a device in the storage system. From the standpoint of a paging system, I/O memory includes a large store for holding many programs and files, and processor memory is a much smaller memory that holds just the programs that the processor has been scheduled to execute and the data that relates to these programs. Data is written into the processor memory or into an I/O memory or data is read from a memory or, in more general terms, a memory is accessed for a read or write operation. The terms fetch and store will be used interchangeably with read and write respectively.

In a paging system, the processor memory is divided into units of a few thousand bytes, and a program or data is brought into processor memory from auxiliary storage in units of this size. This unit of data will be called a "page" and the corresponding unit of physical storage in main memory will be called a "page location" or a "block". A common use for a paging system is in implementing a virtual memory, and the terms virtual memory and paging system are sometimes used interchangeably. In a virtual memory, addresses in a program are independent of the physical address locations that are used when the program actually runs, and the program can be written for a large address space that is independent of the actual size of the physical memory.

A magnetic disk is a typical I/O storage device for a system using this invention. A magnetic disk has circular tracks that are numbered from say 1 to 100. It will be a helpful simplification to suppose that each track holds a page of data so that data transfers between the disk and main memory ordinarily take place as page transfers, and this will be the preferred organization for most implementations of this invention.

The system keeps a File Map Table that tells the track location of programs and files, and in an operation to access data, the central processor transfers a track address to a controller for the disk.

Disk Accessing Delays

A track is further divided into sectors that each hold a binary fraction of a page. One of the advantages of using the complete track as the unit of data transfer is that the transfer can start with the next sector that passes under the read-write head. This technique is called "roll mode", and it avoids the delay that otherwise occurs in waiting for the beginning of a track to reach the read-write head. This rotational delay in reaching a unit of data is called "track latency" or "rotational latency".

In disk access there is another delay in moving the read-write head radially inward or outward from its current track position to the next track that is to be accessed. This delay is called "track seek time". Commonly, only rather large systems have virtual memories, and these systems have high performance disks that have very fast track seek times. A general object of this invention is to reduce the track seek delay so that disks of intermediate performance can be used in a system that is large enough to benefit from a virtual memory system. Thus, this invention is complementary to roll mode, and both techniques might be used to improve disk access time, but the invention will be useful in many systems that do not have pages equal to an integral track and with systems that do not use roll mode.

Some files are composed of subunits called records, and in many cases the records are accessed sequentially, for example in alphabetic order, and the records are advantageously physically arranged in the same sequence on a disk. In this situation, the disk head may be moved progressively from track to track with a minimum seek time. Other files may be accessed in any arbitrary sequence. The seek time is ordinarily longer in this situation, and if tracks were accessed randomly, the read-write head would cross about one third of the tracks on the average seek operation. A general object of this invention is to provide a new method and apparatus for reordering randomly accessed files on a disk so that the pattern of track accesses is more like the case for ordered sequential files.

SUMMARY OF THE INVENTION

An object of this invention is to organize the data on a disk in a way to reduce track seek time. For purposes of this explanation, the operation of the system can be divided into two phases or modes. In both operating phases, a list is kept of the disk seek times of each page in main memory, and it is updated when a new page is brought into memory. During one phase the average of these times is calculated and compared with a reference value. The reference value is preselected to represent an average disk seek time that can be improved to a worthwhile extent by reordering pages on the disk. So long as the average seek time is less than the reference, the system operates in this first phase without reordering pages on the disk. The second phase begins when the average reaches the reference, and in the second phase pages are reordered on the disk as they are bumped from memory. A list is kept of all pages in memory, and pages are selected from the list until each page originally in memory has been rewritten onto a track that may be more advantageously located for a subsequent fetch operation on the same page. The operation then returns to the first phase.

Suppose the pages on the disk were originally ordered and that the system has been operating in phase one but that new programs have begun to execute and that disk accesses have become scattered randomly across the disk tracks and that the average track access time has reached the reference time. If the track addresses are random, the head is moved inward on some disk access operations and outward on others, and the head makes short moves on some accesses and long moves on others. If the information on the tracks could be ordered in the sequence in which the tracks will be accessed, the head motion would be a minimum value. However, in the general case, the order in which pages will be fetched is not known. My system is based on the assumption that the pages will be fetched from disk in the order in which they were previously fetched.

The list for reordering the pages is a first-in-first-out list (called a queue) of pages fetched from disk. When a page is fetched, it is put at the back of the queue, and when a page is to be reordered it is taken from the front of the queue. There is also a conventional list of the tracks that these pages were fetched from, and preferably the pages in memory are returned to the tracks of this original set. When the system of this invention begins reordering the tracks, the pages are selected from the queue and the tracks are selected in order of the track number (either low to high or high to low). Thus the pages are ordered on tracks in the same order in which they were previously fetched from disk.

THE DRAWING

FIG. 2 is a diagram showing the details of the functional block of FIG. 1 that represents some of the components of the track reorderer.

THE PREFERRED EMBODIMENT

1. Conventional Features—FIG. 1

Figure 1:
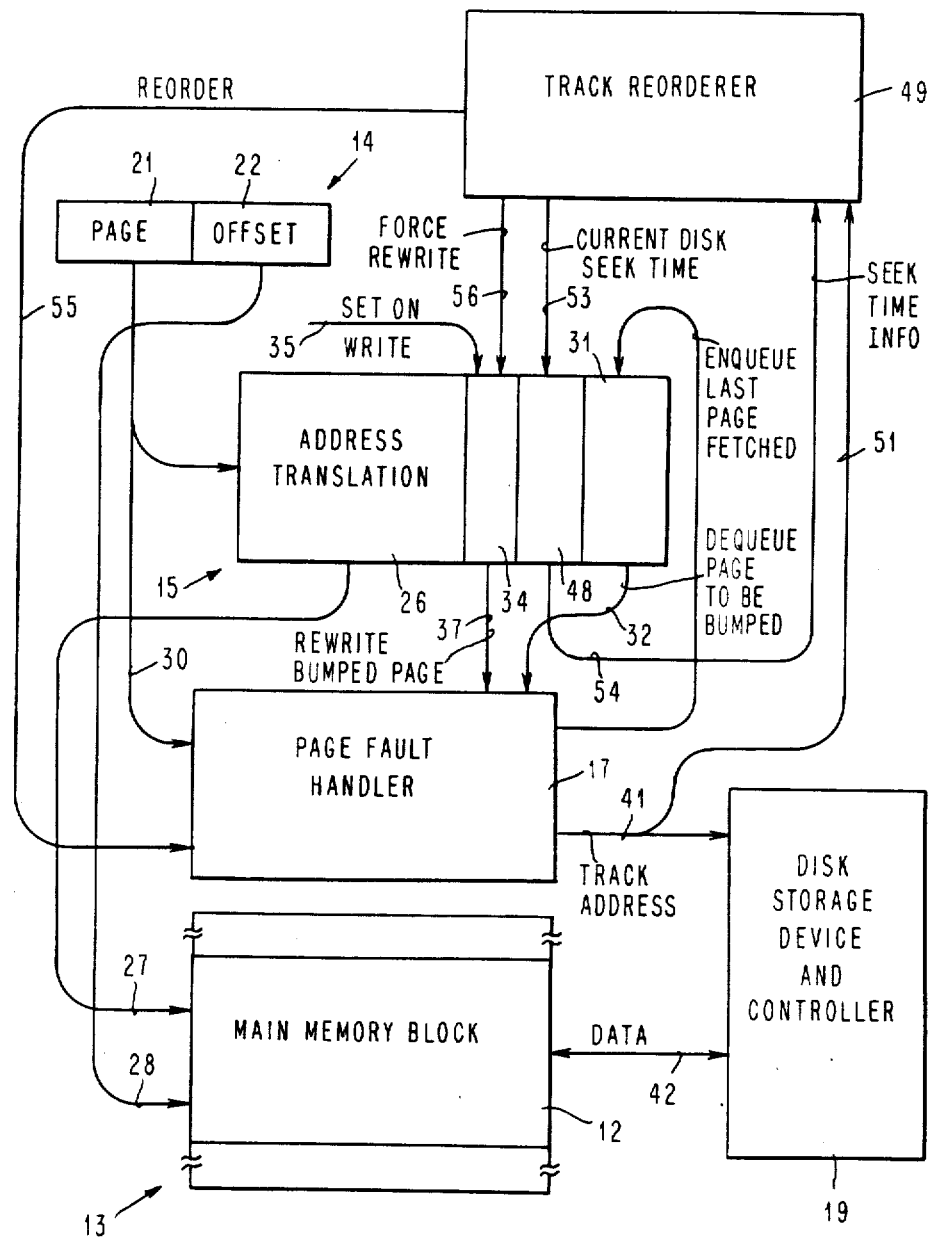
FIG. 1 shows a functional block that represents some of the components of the track reorderer of this invention, and it also shows other functional blocks that represent conventional components of a data processing system that cooperate with the track reorderer or are modified to form part of the track reorderer.

FIG. 1 shows the following conventional components of a data processing system: a representative page location 12 in main memory 13, an address register 14 that holds an address for main memory, a memory 15 (usually separate from memory 13) that holds a Page Map Table that is used for address translation and related functions, a system 17 of programs and other components that will be called a page fault handler, and a disk storage device and its controller 19.

For paging, the address in register 14 is divided into two parts, one part 21 which points to a page location in memory and one part 22 which addresses bytes within the page location. (The system may have a further set of bits called the segment address, but the application of the invention to these systems will be apparent without specific description.) Only the page part of the address is used by the paging system. Through the Page Map Table, the page address bits identify the block in main memory 13 where the page of data is located (if in fact it is in main memory). Through a File Map Table included in the page fault handler, the page address bits identify the address of the same page on the disk.

When main memory is accessed, the page bits in register 14 are sent to the Page Map Table where they are used, in effect, as a search argument to locate the corresponding block address. In the block diagram of FIG. 1, table 15 has a row for each page location in main memory and it has information fields arranged in columns. One of these fields 26 holds information for translating the page address to the block address. If the page is in main memory 15, a match is found and the memory is accessed normally according to the combination of the block address bits on line 27 and the offset bits on line 28.

If an addressed page is not found in main memory, the page address is passed to the page fault handler on line 30, and the page fault handler bumps a page from memory 15 (unless a page location is otherwise available) and fetches the addressed page from disk.

A page is selected for bumping on any suitable basis. FIG. 1 illustrates a FIFO list (first-in-first-out) procedure because there are parallels between a FIFO paging system and the system of this invention. (A more general explanation will be presented later.) In a FIFO system, the identification of each new page is entered at the back of a queue. The page at the front of the queue is of course the page that has been in main memory the longest, and in this paging procedure the page to be bumped is selected from the front of the queue on a line 32. In FIG. 1, the FIFO list is implemented as a field 31 in the Page Map Table. The page fault handler has pointers (addresses) to the front and back of the queue. Each entry in field 31 may be a pointer to the preceding entry in the queue. (The last entry has a nil pointer.) When a page is bumped, the pointer in the fault handler to the front of the queue is updated. When a new page is loaded, the pointer to the back of the queue is updated and the page that was previously at the back of the queue is linked to the new page. These queue management operations are conventional and are readily implemented in several programming languages.

Each entry in the Page Map Table also has a one bit field 34 that is set by a signal on a line 35 when a write operation in a page location causes the corresponding data on the disk to be outdated. If this bit has been set, as signaled on a line 37, the page fault handler rewrites the pages onto the disk when the page is bumped from main memory. Conversely, if the data in memory is unchanged (and this bit is unset), the rewrite operation is not required. The system has a File Map Table of the location of pages of data in secondary storage, and the location on disk for rewriting the page is found from this table. From a different standpoint, the main memory address of the page to be bumped and the location of the disk track is passed to a routine that performs input/output operations.

After space in main memory has been created by bumping a page, the page fault handler fetches the page at the addressed track of the disk and loads it into the memory page location where a page was just bumped. More specifically, the page fault handler translates the page address to a disk track address and passes the track address and the processor memory block address to an input/output routine. In response to the track address and related control signals, the disk performs a seek operation that positions the disk head on the addressed track. There is a delay during the seek operation and there is a further delay while the disk rotates to the position where the read operation is to start. FIG. 1 shows a conventional line 41 for the track address and other control information to the disk controller and a line 42 for the data that is transferred between the disk and memory 13.

This apparatus and the associated operations are conventional, and they have been described only to the extent appropriate to show the relation of this invention to a wide variety of data processing systems that may use this system.

The Reordering Apparatus—FIG. 1

FIG. 1 provides an overview of the track reorderer. It shows the track reorderer partly as a block 49 which is shown in detail in FIG. 2. The track reorderer also includes storage for listing the disk seek time for each page, and in the preferred apparatus this storage is implemented as a field 48 in memory 15. The track reorderer also includes components of the page fault handler, as will be described later.

The page fault handler generates the disk track address as an incident of the conventional operation that has already been described, and this information is sent to the track reorderer on a line 51. The track reorderer uses the track address to generate the track seek time, and it enters track seek time by means of a line 53 into field 48 for the page location where that is addressed by the page fault handler during a paging operation. Note that seek time is associated with the page location in main memory and not with the page of information that is temporarily stored in the page location. When a page is bumped, the previous seek time means most recent seek time.

For the page being bumped from memory, the track reorderer reads the track seek time in field 48 by means of a line 54. When the system is in reordering mode, the reorderer sends a signal to the page fault handler on a line 55 to cause the page fault handler to reorder the disk as pages are bumped from memory. Similarly, when the system begins operating in reordering mode, the track reorderer sets the rewrite bits in field 34 or otherwises causes the page fault handler to rewrite each page onto disk. The reset operation on line 56 is applied only to the original set of pages in memory when reordering. As new pages are fetched during reordering, the bit in field 34 is reset and is then set or left set by the conventional signal on line 35.

Lines 51, 53, 54, 55 and 56 represent signal lines or busses that interconnect the components of the drawing. In many processor systems, these busses will already be provided for general use, and in this case it can be helpful to think of the lines as showing the functional relationships of the components.

The Apparatus of FIG. 2

Lines 51, 53, 54 and 55 of FIG. 2 will be familiar from the description of FIG. 1. The current track address on line 51 is entered into a register 62, and the current track address in register 62 is shifted to a register 64 where it forms the last track address.

The track reorganizer includes an arithmetic and logic unit that in FIG. 2 is represented by three symbols 67, 68, 69 to more explicitly show the flow of information between the arithmetic and logic unit and the data registers. The contents of registers 62 and 64 are applied to unit 67 which forms the absolute difference between the values. The sign that is formed when one of these values is subtracted from the other corresponds to the direction that the disk read-write head has been moved, and the operation of forming the absolute difference discards this information.

The track seek time at the output of unit 67 is applied to line 53 and stored in field 48 of memory 15 for the page location where the paging operation is taking place. It is also applied by a line 70 to unit 68 which calculates the new average seek time. A register 72 holds the average seek time. Unit 68 is connected to combine the previous seek time on line 54, the new seek time from unit 67 and the old average seek time for forming the new average seek time. That is, the old seek time on line 54 is subtracted from the old average seek time and the new seek time is added to the old average seek time to form the new average seek time.

Preferably, track seek time is calculated as the absolute difference (a positive number) between the track number in the current track seek command and the track number of the preceding track seek command. This difference is an appropriate value because the tracks are numbered sequentially and because track seek time is substantially a linear function of the number of tracks that are to be crossed by the read-write head.

A register 75 holds the reference seek time. Unit 9 receives the current average seek time from register 2 and the reference value in register 75 and produces the signal on line 55 to reorder the disk. The compare function is conventional and results in three possible outcomes: less than, equal to, or greater than. When the average is less than the reference, the signal on line 55 is Not Reorder (or Normal Mode) and when the average is greater than the reference the signal is Reorder. The case in which the average and the reference are equal is assigned arbitrarily to either binary value. An equivalent programming statement (in Pascal) is, "if average reference then reorder:=true else reorder:=false". Thus, it can be said that the average has reached the reference or not reached the reference or that it is above or below the reference without regard to how the system handles the case in which the reference and the average are equal.

As the apparatus has been described so far, field 48 in memory 15 holds the numerical track difference and register 72 holds the sum of these differences. In this situation, the value in register 75 would be the reference time for one seek operation multiplied by the number of entries in the list 48 (or the reference in register 75 is the value for one average seek and the value in register 72 is divided by the number of entries to get a comparable value). Equivalently, the new seek time at the output of unit 67 can be divided by the number of entries in the list and the value in register 75 is the reference time for one seek operation. Normally there will be a binary number of page locations in memory 15, and the division or multiplication will be performed by a simple shift. The terms reference and average will be used as general terms that include all of these variations that differ only numerically.

Preferably, the apparatus of FIG. 2 is implemented as general purpose components of the processor system of FIG. 1. Registers 62 and 64 may be general purpose storage locations in memory 13 and the transfers are performed by operations that are identified in a high level programming language by assignment of a value to a variable. For example, the reference seek time can be loaded into register 75 by a statement such as, "ReferenceTime:=47" or "ReferenceTime:=47 * Number Of Pages".

Other measures of track access time will be conveniently available in some systems that this invention may be used with. For example, the actual time in seconds may be available and it will be handled in the way described for track addresses.

Preferably, as the invention has been explained, the apparatus compares the average with the reference each time the page fault handling mechanism is called while the system is in the normal operating mode. Similarly, the average access time can be calculated on a selected multiple number of page faults or on some other suitable basis.

Establishing a Reference Value of Disk Access Time

When track seek time is defined in terms of track numbers, this value can range between zero and a maximum value that is one less than the total number of tracks. Note that if the reference were set at zero the system would operate continuously in track reorganization mode and that if the threshold were set at the maximum the feature would be disabled. The reference can be varied by operating personnel or by automatic means to adapt the system to different kinds of data. For example, it may be desirable to raise the reference value if reordering results in only a small improvement.

If the tracks had a maximum disorder, the result would be analogous to a series of random track numbers. In this random case the average track access time would be about 33% of the maximum value. This result can be understood by considering the approximately analogous game with two dice in which the player's score is the absolute difference between the values showing on the two dice. (The average would be greater than 33% of the maximum if the tracks were perversely arranged.) The random value might be achieved simply by hashing the track addresses during reorganization. Thus, a threshold value of 25% of the maximum seek time is good value to use for understanding the invention and also will be a good starting value in practice.

The threshold value is set low enough to achieve a useful improvement in track seek time. On the other hand, if the threshold is set too low, the system will reorganize the tracks without actually improving the average track seek time or without significantly improving the average track seek time. The appropriate reference time can be calculated from a formal analysis of the page fault handling requirements or it can be selected entirely by trial and error. Preferably, the value is initially selected by the best judgment that can easily be made, and the value is adjusted according to the performance of the system. These adjustments can be entered by operating personnel on a basis such as a log of track seek times: the threshold can be reduced in small steps until no further worthwhile decrease is observed. Alternatively, this iterative procedure can be easily handled by a program. The appropriate value will depend on characteristics of the system that are substantially constant and it will also depend on variable characteristics so that it may be desirable to disable the system for certain operations.

Returning to Normal Mode

While the reordering operation proceeds through the queue, new pages are added as the old pages are returned to disk. The seek times for these pages are stored in the way already described. Ordinarily, many of the newly added pages will be pages that were bumped from memory and removed from the queue and then refetched from memory. Thus, it is desirable to reorder pages only from the original list and to stop the reordering process when the original pages have been reordered. The signal Reorder on line 55 is dropped when the last page of the original list has been bumped from memory and reordered on the disk. The end of the list is recognized by conventional list management techniques, for example by counting the dequeueing operations (for/do) or by saving the pointer to the last entry in the original list and comparing this pointer with the pointer for each page that is bumped (while/do).

The average seek time is preferably not calculated while the system is reordering the list of pages, and the operation proceeds through all of the pages in the list without regard to any change in the average access time that may occur after only some of the pages have been reordered. Alternatively, the system can operate in continuous reordering mode, or it can reorder only until the average has been improved.

Apparatus for a paging system using a least recently used replacement algorithm The track reordering apparatus is also useful with a paging system that bumps the page that was least recently used. More commonly, the system approximates least recent use by means of a one bit field that is set when the associated page location is accessed. After a page fault has been handled, all of these bits are reset, so the bit distinguishes between a set of pages that have been recently used and a complementary set of pages that have not.

A system with a least recently used algorithm does not ordinarily keep a queue of pages, and in the system of this invention a separate page replacement queue is provided for reordering. The disk seek times are kept in the page map table as in FIG. 1 and this field is handled in the same way as before. The apparatus includes means to inhibit the normal page replacement mechanism while the disk is being reordered in the way already described.

For a more general understanding of the invention, consider the functions of the queue in the preferred embodiment: the queue defines (1) a set of track locations, (2) a set of pages to be reordered, (3) the physical sequence in which the pages will be reordered on the disk, and (4) the time sequence in which the pages will be bumped from memory. The preferred embodiment uses these features of the queue for particular advantages that may not be necessary in all application of the invention.

Ordinarily it will be an advantage to relocate the pages among the tracks that the pages originally came from, but the pages may be relocated among a different set of tracks, for example on a second disk, or partly among the original tracks and partly among an additional set of tracks.

Preferably, reordering is started when the reference time is reached and is continued until each page in the original set of pages has been reordered. However, reordering can be partly discontinued at any time, for example if the average time improves to below the reference time. For this operation, the remaining pages of the set will be assigned to available tracks and will be rewritten as necessary to make sure that all pages are restored on the disk. Alternatively, the original set of pages to be reordered can be selected from a subset of the queue.

Ordinarily it will be advantageous to bump the memory pages in the order of the queue. This will usually simplify the operations of maintaining the queue. Since the queue is commonly used for page replacement, this procedure should meet the objectives of the page replacement system. However, the pages can be selected for bumping on any other suitable basis and then located on the disk in the physical sequence defined by the queue.

Other Embodiments

Those skilled in the art will recognize a variety of applications for this invention and appropriate modifications within the spirit of the invention and the scope of the claims.

I claim:

1. In a data processing system having
   means for transferring pages of data between tracks of a disk storage device and page locations of a main memory, including means for selecting a track address,
   means for bumping a page from main memory when a page location is needed for an addressed page, including means for rewriting a bumped page into the next available tracks as pages are bumped from main memory, and including means for identifying data pages in page locations of main memory and for identifying whether the page in memory has been changed from the page on disk, and means for selectively rewriting a page from memory onto disk only if a change has been made,
   apparatus for reordering the pages on the tracks of the disk for reduced track seek time, comprising,
   means for maintaining a queue of pages brought into main memory from the disk,
   means for measuring track seek time and means for maintaining a list containing the track seek time for each page location, wherein said means for maintaining the seek time list comprises
     storage means for holding the seek time for each page location,
     means providing the address of the track last accessed and the track currently being accessed, and
     means for forming the absolute difference between said last and currently accessed track addresses and for storing a function of the difference as the track seek time in said storage means for the page location storing data from said currently addressed track
   means operable when the tracks are to be reordered for requiring said means for selectively rewriting to rewrite each page without regard to whether a change has been made in a page,
   means for calculating the average seek time for said page locations, means for providing a reference value of track seek time and means for comparing said average seek time with said reference seek time, said means for comparing providing a binary-valued signal signifying that the pages are to be reordered on the tracks of the disk for reduced seek time when said average reaches said reference or signifying that said average is below said reference, and
   means in said page transferring means for identifying a set of disk tracks available for storing the pages from memory, and means operable in response to said signal that the pages are to be reordered for controlling said page transferring means for rewriting the pages into a physical sequence of said available tracks according to the sequence of pages in said queue,
   whereby after said reference is reached the pages transferred to the disk from main memory are physically reordered on the disk in the sequence in which they were previously fetched from the disk and whereby subsequently fetching the same pages in approximately the same order may improve the average seek time.

* * * * *